United States Patent [19]

Satoh et al.

[11] Patent Number: 5,309,380
[45] Date of Patent: May 3, 1994

[54] COMPUTER DISPLAY FOR INPUT AND DISPLAY OF IMPROPER AND MIXED FRACTIONS

[75] Inventors: Akiyoshi Satoh; Michiaki Kuno, both of Yamatokoriyama, Japan

[73] Assignee: Sharp Kabushiki Kaisha, Osaka, Japan

[21] Appl. No.: 921,022

[22] Filed: Jul. 29, 1992

[30] Foreign Application Priority Data

Jul. 31, 1991 [JP] Japan .................................. 3-191648

[51] Int. Cl.⁵ .............................................. G06F 3/02
[52] U.S. Cl. ................................................ 364/709.07
[58] Field of Search ................................... 364/709.07

[56] References Cited

U.S. PATENT DOCUMENTS 4,545,022  10/1985  Hughins ......................... 364/709.07
5,089,980  2/1992   Bunsen et al. .................. 364/709.07
5,138,566  8/1992   Comforti ........................ 364/709.07

Primary Examiner—David H. Malzahn
Attorney, Agent, or Firm—Nixon & Vanderhye

[57] ABSTRACT

A calculator keyboard includes various keys such as numeric keys, a mixed fraction key, and a fraction key, a RAM, a ROM and a CPU. A character including a value or variable for a mixed fraction may be input and displayed separately as an integer, a numerator, and a denominator. Any of the characters in the mixed fraction may be edited subsequently. In addition, a fraction may be first input and displayed, and thereafter, an integer of a mixed fraction may be input and displayed. Consequently, unnecessary movement of the cursor is avoided in editing of fractions on the calculator display thereby facilitating easy and efficient operation.

7 Claims, 9 Drawing Sheets

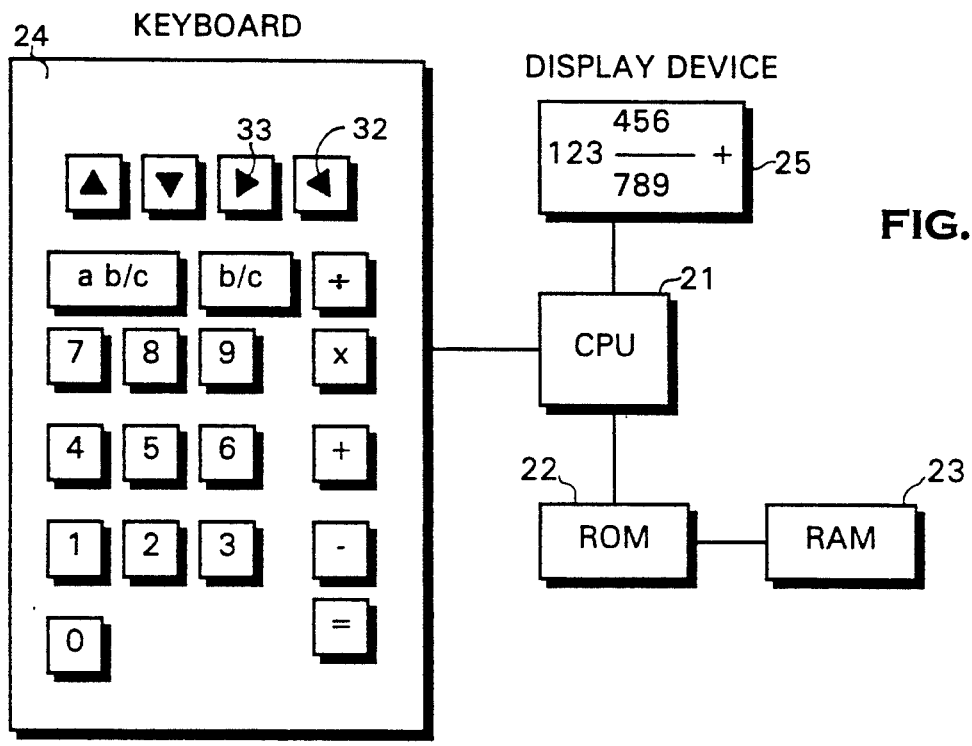
FIG. 1
FIG.2A KEY SEQUENCE   DISPLAY SCREEN   INTERNAL REPRESENTATION
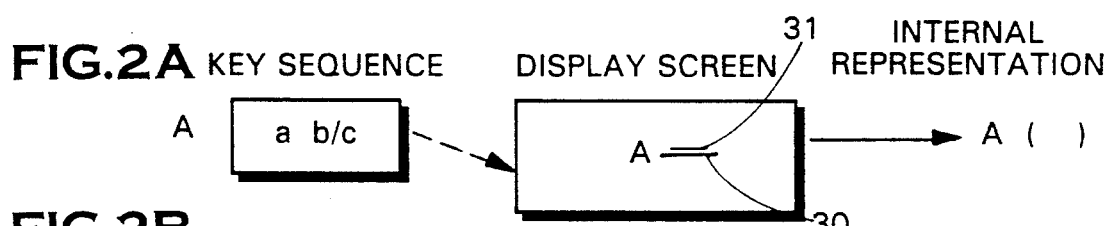
FIG.2B
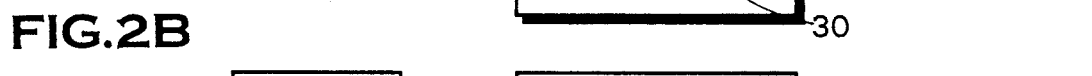
FIG.2C
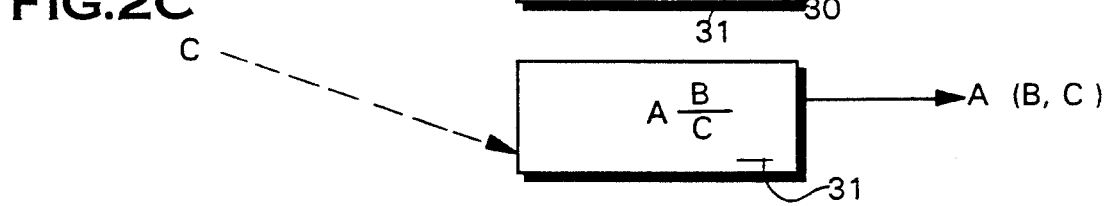

| | KEY SEQUENCE | DISPLAY SCREEN | INTERNAL REPRESENTATION |
|---|---|---|---|
| FIG.4A | B | B / 31 | B |
| FIG.4B | b/c | B / 31 / 30 | (B, ) |
| FIG.4C | C | B/C / 31 | (B, C) |
| FIG.4D | ◄,◄,◄,◄, A | [A] B/C / 31a | A (B,C) |

FIG.6A

CALCULATED RESULT → DISPLAY SCREEN:
$$2\frac{2}{3} + \frac{2}{3} =$$
$$3\frac{1}{3}$$

FIG.6B

KEY SEQUENCE + →
$$3\frac{1}{3} + -$$

FIG.14A (PRIOR ART)  KEY SEQUENCE   DISPLAY SCREEN
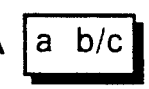 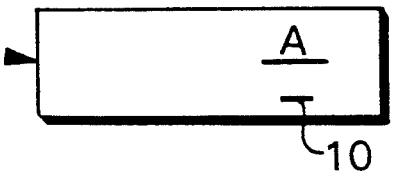
FIG.14B (PRIOR ART)
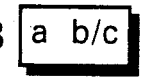 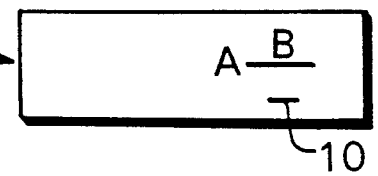
FIG. 14C (PRIOR ART)  C
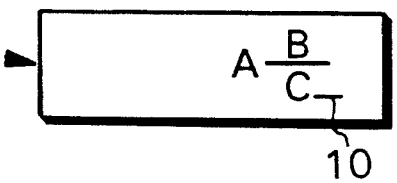
FIG.15A (PRIOR ART)   FIG.15B (PRIOR ART)   FIG.15C (PRIOR ART)
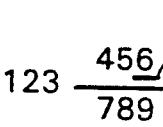 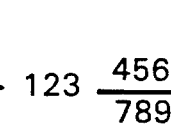 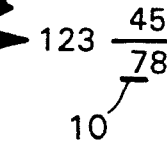

COMPUTER DISPLAY FOR INPUT AND DISPLAY OF IMPROPER AND MIXED FRACTIONS

BACKGROUND OF THE INVENTION

1. Field of the Invention

The present invention relates to a computer in which a value or a variable (a character) can be input and displayed in the form of a mixed fraction.

2. Description of the Prior Art

FIGS. 14A to 14C show a conventional processing for inputting and displaying a mixed fraction using such a computer. In FIGS. 14A to 14C, a key sequence and a display screen output are shown in the left and right portions, respectively. Each of the symbols A, B, and C represents a value or variable. The symbols A, B, and C respectively denote an integer, the numerator, and the denominator of a mixed fraction.

When a mixed fraction having an integer A and a fraction B/C is to be input, numeric keys or character keys and a mixed fraction key "a b/c" provided on a keyboard are used.

First, the integer A is input and initially displayed at a numerator position, as shown in FIG. 14A. When the mixed fraction key "a b/c" is depressed, the display position of the integer A is moved to an integer portion, as shown in FIG. 14B.

Next, the numerator B is input and displayed at the numerator position, as shown in FIG. 14B. When the mixed fraction key "a b/c" is depressed, the computer goes into a state for waiting an input of the denominator C. A cursor 10 which is shown as a thick underline remains at a denominator position up to this step.

Thereafter, the denominator C is input and displayed at the denominator position, as shown in FIG. 14C. The cursor 10 is moved to the next column on the right side. Thus, a process for inputting and displaying the mixed fraction having the integer A and the fraction B/C is completed.

When an expression in the form of a mixed fraction is displayed, the cursor 10 is moved to a different position, especially from the numerator position to the denominator position in the following manner. The manner is described with reference to FIGS. 15A to 15C.

It is assumed that the underline cursor 10 is positioned at the right end value "6" of the numerator, as shown in FIG. 15A. When a right directional cursor key 11 which is represented by a triangle pointing in the right direction is depressed, the cursor 10 is once moved to a next column on the right side of the right end value "6" of the numerator, as shown in FIG. 15B. At the same time, a borderline 12 between the denominator and the numerator is elongated by a column.

The blank column in the elongated portion of the borderline 12 may be used for inserting or adding a value.

When the right directional cursor key 11 is depressed again without adding a value, the cursor 10 is moved to the left end value "7" of the denominator, as shown in FIG. 15C. At the same time, the elongated portion of the borderline 12 is deleted.

Thus, a process for moving the cursor 10 from the right end of the numerator to the left end of the denominator is completed.

When a value or a variable (a character) is input for the expression in the form of a mixed fraction, the value or variable is input in the order of an integer, a numerator and a denominator, as described above. However, when the integer A is input, the integer A is once displayed at the numerator position and then moved to the integer position, as shown in FIGS. 14A and 14B. Therefore, the conventional processing is likely to cause a misunderstanding or a mistake in the input operation.

In a case where a value or a variable (a character) is input for an expression in the form of an improper fraction or a proper fraction, in order to change the input destination from the numerator to the denominator, a fraction key "b/c" is used instead of the mixed fraction key "a b/c". Conventionally, once an improper fraction or a proper fraction is input using the fraction key "b/c", the fraction cannot be modified by adding or inserting a value or a variable for an integer at the left of the fraction so as to make a mixed fraction.

As described above with reference to FIGS. 15A to 15C, when the cursor 10 is moved on the displayed expression in the form of a mixed fraction, such an unnatural and useless movement or display change that the borderline 12 between the denominator and the numerator is elongated and the cursor 10 is moved to the elongated portion occurs, which causes the operator to be confused.

SUMMARY OF THE INVENTION

The computer of this invention comprises: input means for inputting data; signal generating means for generating a signal indicating that the data input by the input means is a value for one of an integer, a numerator, and a denominator of a mixed fraction; display means for displaying data; storing means for storing the input data, and a display position of the data in the display means; and processing means for performing: a first process for, after first data input by the input means is displayed at a first position for displaying an integer of a mixed fraction in the display means, and when the signal generated by the signal generating means is detected, displaying a borderline between a numerator and a denominator of the mixed fraction, for generating a signal for moving a cursor to a second position for displaying the numerator, and for storing the first data as data for the integer of the mixed fraction into the storing means; a second process for, after second data input by the input means is displayed at the second position, and when the signal generated by the signal generating means is detected, generating a signal for moving the cursor to a third position for displaying the denominator, and for storing the second data as data for the numerator of the mixed fraction into the storing means; and a third process for displaying third data input by the input means at the third position, for generating a signal for moving the cursor to a next column on the right side of the displayed third data, and for storing the third data as data for the denominator of the mixed fraction into the storing means.

In another embodiment of the invention, the computer comprises input means for inputting data; first signal generating means for generating a signal indicating that the data input by the input means is a value for one of a numerator and a denominator of a fraction; display means for displaying data; storing means for storing the input data, and a display position of the data in the display means; second signal generating means for generating a signal for moving a cursor displayed on the display means in the upper, lower, right or left direction by a column; and processing means for performing: a first process for displaying first data input by the input means at a first position in the display means, and for storing the first data into the storing means; a second process for, when the signal generated by the first signal generating means is detected, displaying a borderline between a numerator and a denominator of the fraction at the right of the first position, for moving the first data to a second position for displaying the numerator so as to display the first data at the second position, for generating a signal for moving the cursor to a third position for displaying the denominator, and for storing the first data as data for the numerator of the fraction into the storing means; a third process for displaying second data input by the input means at the third position, for generating a signal for moving the cursor to the next column on the right side of the displayed second data, and for storing the second data as data for the denominator of the fraction into the storing means; and a fourth process for, when a signal generated by the second signal generating means is detected, sequentially moving the cursor to the third position, the second position and then the first position, for, when the cursor is stopped at the next column on the left side of the first position, displaying third data input by the input means at the position where the cursor is stopped, and for storing the third data as data for an integer of a mixed fraction into the storing means.

In another embodiment of the invention, the computer comprises: input means for inputting data; display means for displaying a cursor and data input by the input means as a value for one of an integer, a numerator, and a denominator of a mixed fraction; signal generating means for generating a signal for moving the cursor displayed on the display means in the upper, lower, right or left direction by a column; first means for changing the cursor from a first type to a second type, when a signal is generated by the signal generating means in a state where the cursor is positioned at the right end of a numerator; second means for moving the cursor to the left end of a denominator and changing the type of the cursor to the first one, when a signal is generated by the signal generating means in a state where the cursor is positioned at the right end of the numerator and the cursor is of the second type; third means for changing the type of the cursor from the first one to the second one, when a signal is generated by the signal generating means in a state where the cursor is positioned next to the borderline between the numerator and the denominator on the left side; fourth means for moving the cursor to the left end of the numerator and changing the type of the cursor to the first one, when a signal is generated by the signal generating means in a state where the cursor is positioned next to the borderline between the numerator and the denominator on the left side and the cursor is of the second type; fifth means for moving the cursor to a next column on the right side of the denominator when data is input by the input means in a state where the cursor is positioned at the right end of the denominator and the cursor is of the second type, and displaying the data at a position of the cursor; and sixth means for moving the cursor to a next column on the right side, when a signal is generated by the signal generating means in a state where data exits at the position of the cursor.

In still another embodiment of the invention, the computer comprises: input means for inputting data; display means for displaying a cursor and data input by the input means as a value for one of an integer, a numerator, and a denominator of a mixed fraction; signal generating means for generating a signal for moving the cursor displayed on the display means in the upper, lower, right or left direction by a column; first means for changing the cursor from a first type to a second type, when a signal is generated by the signal generating means in a state where the cursor is of the first type and the cursor is positioned at the left end of a denominator; second means for changing the type of the cursor to the first one, when a signal is generated by the signal generating means in a state where the cursor is of the second type; third means for moving the cursor, when a signal is generated by the signal generating means in a state where the cursor is of the first type, the cursor is positioned at the left end of a numerator, and data exists at the left of a borderline between the numerator and the denominator, to the data position at the left of the borderline and changing the type of the cursor to the second one; fourth means for moving the cursor to the right end of the denominator and changing the type of the cursor to the second one, when a signal is generated by the signal generating means in a state where the cursor is of the first type and the cursor is positioned at a next column on the right side of the right end data of the denominator; and fifth means for moving the cursor, when a signal is generated by the signal generating means in a state where data exists at the left of the cursor, to the position of the data.

In another aspect, the method for operating a cursor of a computer of the invention, the computer comprising: input means for inputting data; and signal generating means for generating a signal for moving a cursor displayed on the display means in the upper, lower, right or left direction by a column, comprises the steps of: changing the cursor from a first type to a second type, when a signal is generated by the signal generating means in a state where the cursor is positioned at the right end of a numerator; moving the cursor to the left end of a denominator and changing the type of the cursor to the first one, when a signal is generated by the signal generating means in a state where the cursor is positioned at the right end of the numerator and the cursor is of the second type; changing the type of the cursor from the first one to the second one, when a signal is generated by the signal generating means in a state where the cursor is positioned next to the borderline between the numerator and the denominator on the left side; moving the cursor to the left end of the numerator and changing the type of the cursor to the first one, when a signal is generated by the signal generating means in a state where the cursor is positioned next to the borderline between the numerator and the denominator on the left side and the cursor is of the second type; moving the cursor to a next column on the right side of the denominator when data is input by the input means in a state where the cursor is positioned at the right end of the denominator and the cursor is of the second type, and displaying the data at a position of the cursor; and moving the cursor to a next column on the right side, when a signal is generated by the signal generating means in a state where data exits at the position of the cursor.

In another aspect, the method for operating a cursor of a computer of the invention, the computer comprising: signal generating means for generating a signal for moving a cursor displayed on the display means in the upper, lower, right or left direction by a column, comprises the steps of: changing the cursor from a first type to a second type, when a signal is generated by the signal generating means in a state where the cursor is of the first type and the cursor is positioned at the left end of a denominator; changing the type of the cursor to the first one, when a signal is generated by the signal generating means in a state where the cursor is of the second type; moving the cursor, when a signal is generated by the signal generating means in a state where the cursor is of the first type, the cursor is positioned at the left end of a numerator, and data exists at the left of a borderline between the numerator and the denominator, to the data position at the left of the borderline and changing the type of the cursor to the second one; moving the cursor to the right end of the denominator and changing the type of the cursor to the second one, when a signal is generated by the signal generating means in a state where the cursor is of the first type and the cursor is positioned at a next column on the right side of the right end data of the denominator; and moving the cursor, when a signal is generated by the signal generating means in a state where data exists at the left of the cursor, to the position of the data.

Thus, the invention described herein makes possible the advantage of providing a computer in which a value or a variable (a character) for an expression in the form of a mixed fraction can be input and displayed separately as an integer, a numerator, and a denominator of the mixed fraction. The computer according to the invention is capable of (1) minimizing the movement of a cursor on a display screen, (2) inputting and displaying, after a value or a variable (a character) for an expression in the form of an improper or proper fraction is input and displayed as a numerator and a denominator of the fraction, a value or a variable (a character) as an integer so as to make a mixed fraction, and (3) eliminating unnecessary movement of a cursor on a displayed expression in the form of a mixed fraction or a fraction such as when a borderline between a numerator and a denominator of a mixed fraction or a fraction is elongated and the cursor is moved to the elongated portion, so that the mixed fraction or fraction can be smoothly edited to change or add a value or a variable (a character) for each column of an integer, a numerator or a denominator of the mixed fraction, or an integer or a denominator of the fraction.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram showing a hardware configuration of a computer utilizing processing for inputting and displaying a mixed fraction in one example according to the invention.

FIGS. 2A to 2C illustrate an example of the processing for inputting and displaying a mixed fraction according to the invention.

FIGS. 4A to 4D illustrate another example of the processing for inputting and displaying a mixed fraction according to the invention.

FIGS. 6A and 6B show processing in an arithmetic calculation according to the invention.

FIGS. 13A to 13C illustrate another example of the operation for moving the cursor in the left direction according to the invention.

FIGS. 14A to 14C illustrate processing for inputting and displaying a mixed fraction in a conventional computer.

FIGS. 15A to 15C illustrate an operation for moving a cursor in the conventional computer.

DESCRIPTION OF THE PREFERRED EMBODIMENTS

Figure 3:
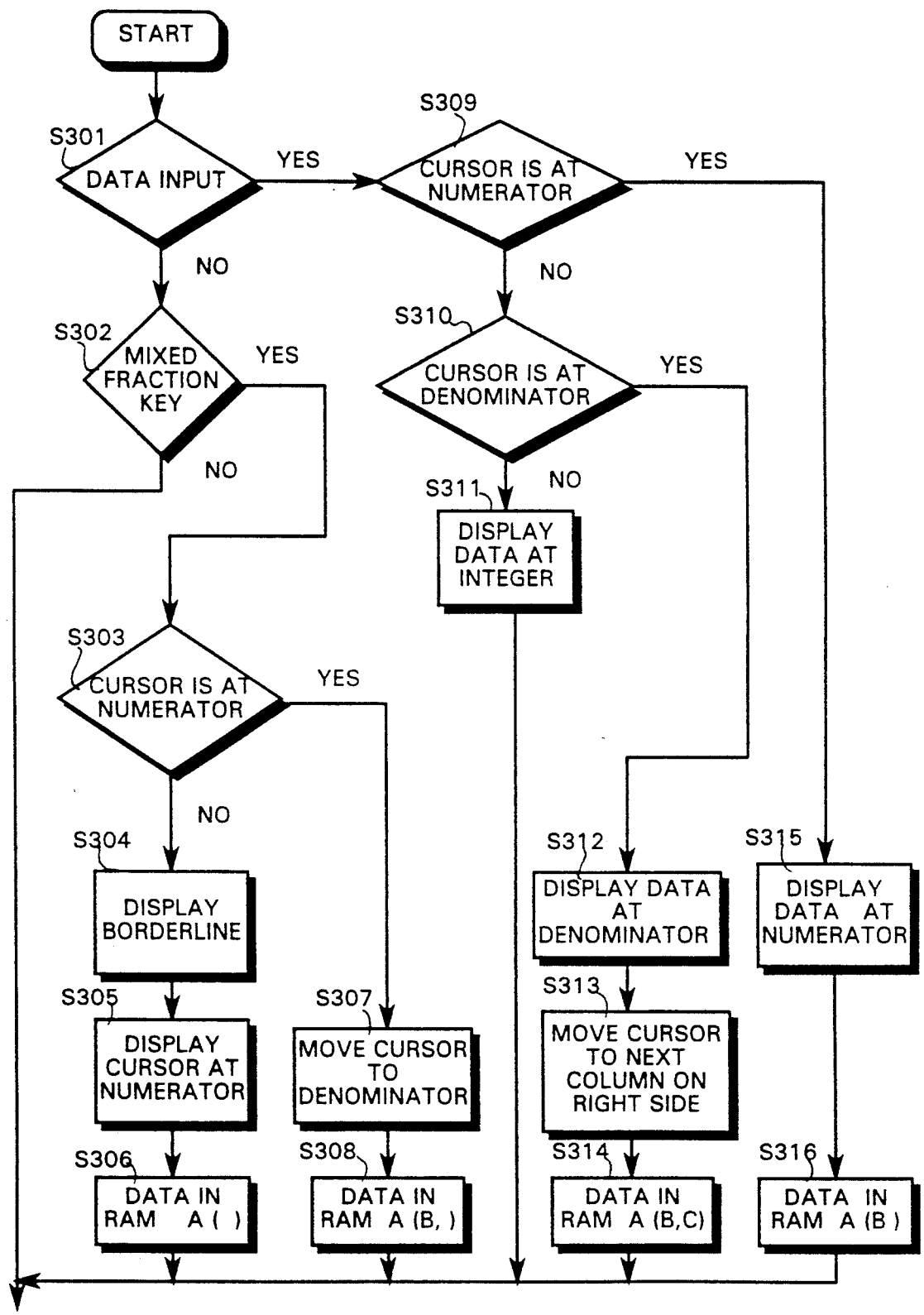
FIG. 3 is a flowchart illustrating the processing for inputting and displaying a mixed fraction according to the invention.

FIG. 1 is a block diagram showing a hardware configuration of a computer utilizing processing for inputting and displaying a mixed fraction according to the invention.

In FIG. 1, the computer comprises a CPU 21 for controlling the operation of the computer, a read only memory (ROM) 22 for storing programs, a random access memory (RAM) 23 as a working memory, a keyboard 24 including various keys, and a display device 25 such as a liquid crystal display panel. The keyboard 24 includes numeric keys "0" to "9", arithmetic calculation keys, an equal key "=", a mixed fraction key "a b/c", a fraction key "b/c", and upper, lower, right and left directional cursor keys.

Now, the operation of the computer for inputting and displaying a mixed fraction will be described.

When the numeric keys "0" to "9" are depressed while depressing one of the equal key and the arithmetic calculation keys, the input numeric data are converted into corresponding character data of "A", "B", "C", "D", "E", "F", "G", "H", "I", and "J", by a process of the CPU 21, respectively. The character data can be on or more variable.

After depressing the equal key "=", numeric data can be substituted for the variable using the numeric keys. When a mixed fraction or a fraction with variables is input and displayed in advance, values can be substituted for the variables later. Accordingly, a calculation with respect to the mixed fraction or fraction can be performed.

The cursor can be moved in the right left upper or lower direction using the cursor.

An example of the processing fellowed for inputting and displaying a mixed fraction is described with reference to FIGS. 2A-2C and 3. Key sequences are shown in the left portion of FIGS. 2A-2C, display screens in the middle portion thereof, and internal representations in the CPU 21 and the RAM 23 in the right portion thereof. Each of the symbols A, B, and C represents a value or a variable. The symbols A, B, and C denote an integer, a numerator, and a denominator of a mixed fraction, respectively.

In the example shown in FIGS. 2A-2C, the mixed fraction is input in the order of the integer A, the numerator B and the denominator C. Specifically, when the integer A is input by operating the keyboard 24, the CPU 21 positions that data neither at a numerator position nor a denominator position—but rather the integer A is displayed at an integer position from the beginning, as shown in FIG. 2A. The above process corresponds to a routine of steps S301→S309→S310→S311 in the flowchart of FIG. 3. When the mixed fraction key "a b/c" of the keyboard 24 is depressed, the CPU 21 determines that the depression is not for data input, that a mode for inputting a mixed fraction is selected, and that the cursor is not positioned at the numerator position. A border line 30 between a numerator and a denominator is then displayed on the display device 25. Also, a cursor 31 (a thick underline) is displayed at the numerator position over the border line 30. The CPU 21 stores the integer A in into the RAM 23 as the following internal representation:

A fraction ( )

The above process corresponds to the process routine of steps S301→S302→S303→S304→S305→S306 in the flowchart of FIG. 3. Then, the computer goes into a waiting state for the input of the numerator B.

When the numerator B is input by operating the keyboard 24, the CPU 21 detects the data input and that the cursor is positioned at the numerator position. The numerator B is displayed at the position of the cursor 31 in FIG. 2A, i.e., at the numerator position on the display device 25 from the beginning, as shown in FIG. 2B. The CPU 21 controls to store that the integer is A and the numerator is B into the RAM 23 as the following internal representation:

A fraction (B)

The above process corresponds to a routine of steps S301→S309→S315→S316 in the flowchart of FIG. 3.

When the mixed fraction key "a b/c" is depressed, the CPU 21 determines that the key depression is not for data input, that the mixed fraction key is depressed, and that the cursor is positioned at the numerator position. Then, the CPU 21 moves the cursor 31 to the denominator position and adds "," after "B" in the internal representation so as to store integer is A and the numerator B in into the RAM 23 using the following internal representation and sets the computer in a waiting state for input of the denominator C:

A fraction (B, )

The above process corresponds to a routine of steps S301→S302→S303→S307→S308 in the flowchart of FIG. 3.

When the denominator C is input by operating the keyboard 24, the CPU 21 detects the data is input and that the cursor is not positioned at the numerator position, but at the denominator position. The denominator C is displayed at the denominator position of the display device 25, as shown in FIG. 2C. The cursor 31 is then moved to the next column on the right side. The CPU 21 stores the integer A, the numerator B, and the denominator C in the RAM 23 the following internal representation:

A fraction (B, C)

The above process corresponds to a routine of steps S301→S309→S310→S312→S313→S314 in the flowchart of FIG. 3.

As described above, the integer A, the numerator B and the denominator C are displayed at their positions from the beginning, thereby eliminating the wasted cursor movement of the prior art which simplifies the input operation.

Now, referring to FIGS. 4A-4D and 5, another example of the processing procedure for inputting and displaying a mixed fraction is described. In this example, an integer and a fraction of the mixed fraction are separately input, with the integer being input after the fraction is input and displayed.

When a numerator B of the fraction (which may be a proper or improper one) is input via the keyboard 24, the CPU 21 detects the date input and that the cursor is in a half-tone dot meshing format and not positioned at the denominator position. The numerator B is displayed at a vertically middle position (an initial position) of the display device 25, as shown in FIG. 4A. The cursor 31 is moved to the next column on the right side. The numerator B is stored into the RAM 23 in the following internal representation:

B

Figure 5:
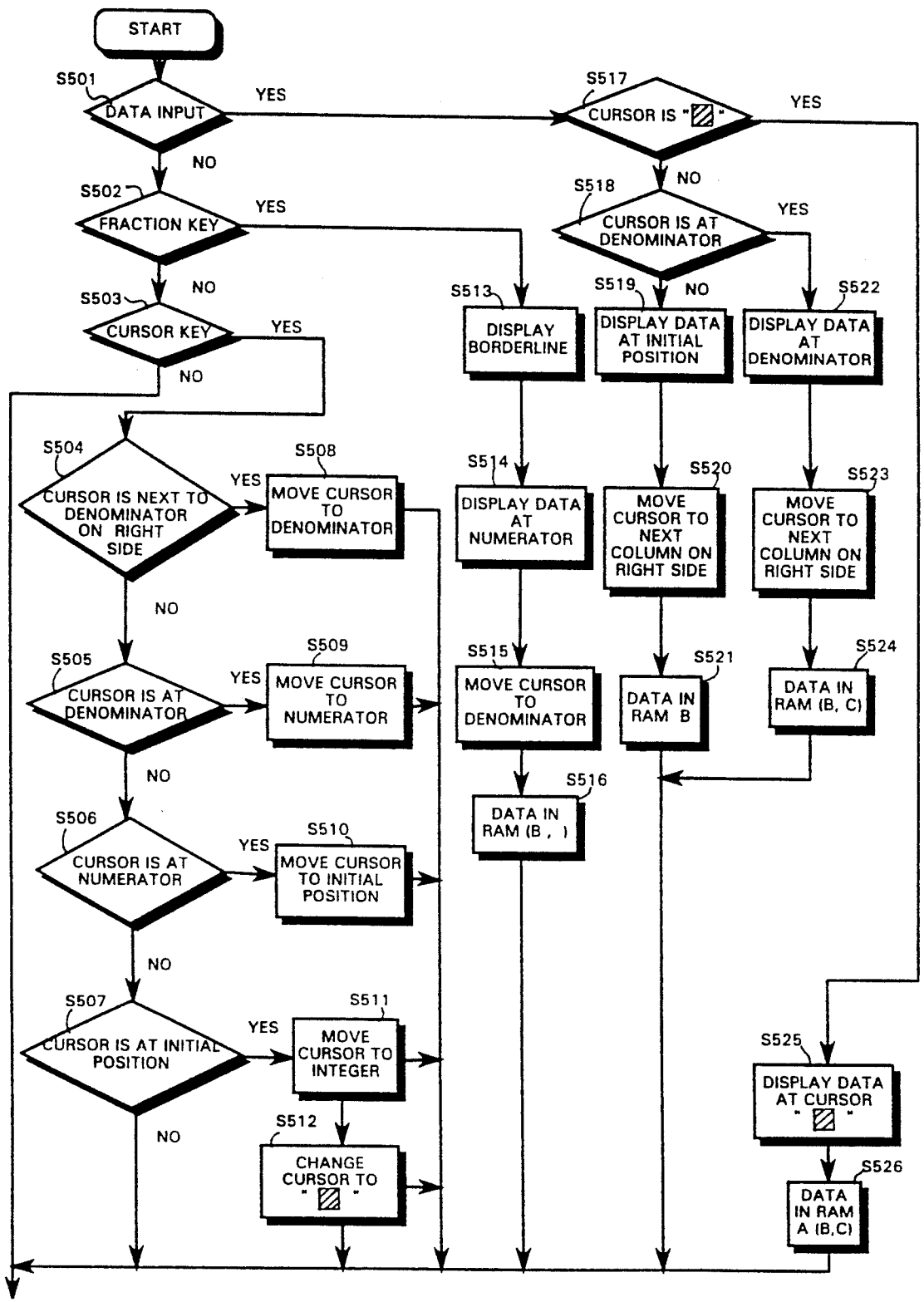
FIG. 5 is a flowchart illustrating the processing for inputting and displaying a mixed fraction according to the invention.
Figure 7:
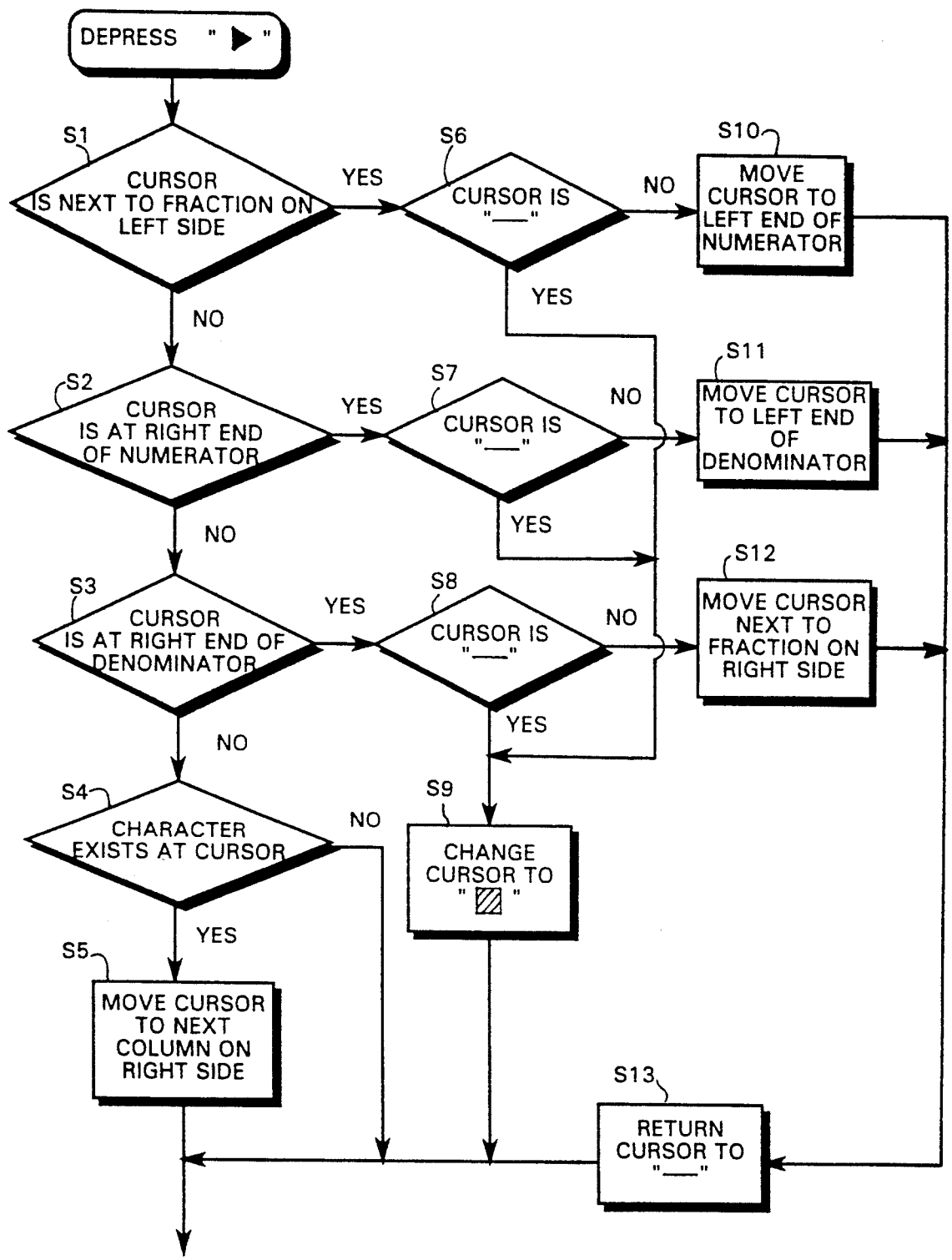
FIG. 7 is a flowchart illustrating an operation for moving the cursor in the right direction according to the invention.

The above process corresponds to a routine of steps S501→S517→S518→S519→S520→S521 in the flowchart of FIG. 5. When the fraction key "b/c" is depressed, the CPU 21 determines that the depression is not for the data input, that the fraction key is depressed and that a numerator of a fraction is selected. A border line 30 between the numerator and denominator is displayed and the numerator B is displayed over the border line 30, as shown in FIG. 4B. While awaiting the input of the denominator C, the cursor 31 is displayed under the border line 30. The CPU 21 stores numerator B in into the RAM 23 as the following internal representation:

fraction (B, )

The above process corresponds to a routine of steps S501→S502→S513→S514→S515→S516 in the flowchart of FIG. 5.

When the denominator C is input by operating the keyboard 24, the CPU 21 detects the date input and that the cursor is not in a half-tone dot meshing format and is positioned at the denominator position. The denominator C is displayed on the display device 25 at the position of the cursor 31 in FIG. 4B, as shown in FIG. 4C. The cursor 31 is moved to the next column on the right side. The CPU 21 stores the fraction having the numerator B and denominator C in the RAM 23 in the following internal representation:

fraction (B, C)

The above process corresponds to a routine of steps S501→S517→S518→S522→S523→S524 in the flowchart of FIG. 5.

An integer A is added at the left of the fraction B/C in the following manner.

A left directional cursor key 32 of the keyboard 24 represented by a triangle pointing in the left direction is depressed. The CPU 21 determines that this depression is not for data input, that the fraction key is not depressed, but that a cursor key is depressed. The CPU 21 judges where the cursor is currently positioned next to the denominator position on the right side, at the denominator position, at the numerator position, or at the initial position. The cursor 31 is then moved from the next column to the denominator on the right side to the denominator or the numerator, and the cursor 31 is once stopped at the initial position at the left of the fraction B/C. Then, the underline cursor 31 is moved to the integer position and its format changed to a half-tone dot meshing cursor 31a. The above process corresponds to a routine of steps S501→S502→S503→S504→S508, steps S501→S502→S503→S504→S505→S509, steps S501→S502→S503→S504→S505→S506→S510, and steps S501→S502→S503→S504→S505→S506→S507→S511→S512 in the flowchart of FIG. 5.

In this state, when the integer A is input by operating the keyboard 24, the CPU 21 determines that data is input and that the cursor is a in half-tone dot meshing format. The integer A is displayed at the position of the half-tone dot meshing cursor 31a on the display device 25, as shown in FIG. 4D. The CPU 21 stores the resulting mixed fraction having the integer A, the numerator B and the denominator C in the RAM 23 as the following internal representation:

A fraction (B, C)

The above process corresponds to a routine of steps S501→S517→S525→S526 in the flowchart of FIG. 5.

As described above, when the fraction B/C is first input, the integer A can be input and displayed at the left of the fraction B/C.

As shown in FIG. 6A, a fraction (a mixed fraction) is input and displayed in either one of the above-mentioned methods. After depressing one of the arithmetic calculation keys, a fraction (a mixed fraction) is input and displayed. Then, by depressing the equal key "=", the CPU 21 performs the specified arithmetic calculation. The calculated result is displayed at the lower-right position of the display device 25. The CPU 21 stores the calculated mixed fraction in the RAM 23 in the following internal representation:

A fraction (B, C)

Thereafter, when one of the arithmetic calculation keys is depressed, the mixed fraction which has been stored in the RAM 23 is displayed at the upper-left position of the display device 25, as shown in FIG. 6B. In this way, arithmetic calculations can be performed in a stepwise fashion.

Next, an operation for moving the cursor 31 of the right (lower) direction in the mixed fraction displayed on the display device 25 is described with reference to FIGS. 7, 8A-8C, 9A-9B and 10A-10C.

Figures 8A, 8B, 8C:
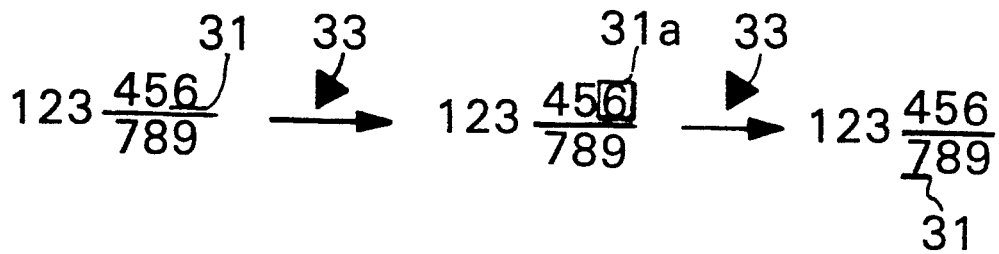
FIGS. 8A to 8C illustrate an example of the operation for moving the cursor in the right direction according to the invention.

In an example shown in FIGS. 8A-8C, the integer A is "123", the numerator B is "456", and the denominator C is "789". In FIG. 8A, the underline cursor 31 is positioned at the right end value "6" of the numerator B. When the right directional cursor key 33 of the keyboard 24 is depressed, the underline cursor 31 is changed to a half-tone dot meshing cursor 31a, as shown in FIG. 8B. The above operation corresponds to a routine of steps S1→S2→S7→S9 in the flowchart of FIG. 7.

When the right directional cursor key 33 is depressed again, the half-tone dot meshing cursor 31a is changed back to the underline cursor 31 and the underline cursor 31 is positioned at the position of the left end value "7" of the denominator C. The above operation corresponds to a routine of steps S1→S2→S7→S11→S13 in the flowchart of FIG. 7.

Figures 9A, 9B:
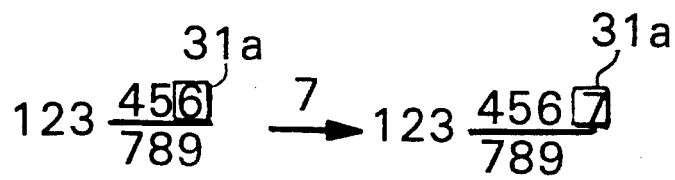
FIGS. 9A and 9B illustrate an operation for adding a value according to the invention.

FIG. 9A shows the same display state as FIG. 8B. In this state, a value or a variable can be inserted or added. For example, when a value "7" is input by operating the keyboard 24, "7" is added to the numerator B of "456". Accordingly, the numerator B becomes "4567", as shown in FIG. 9B.

Figures 10A, 10B, 10C:
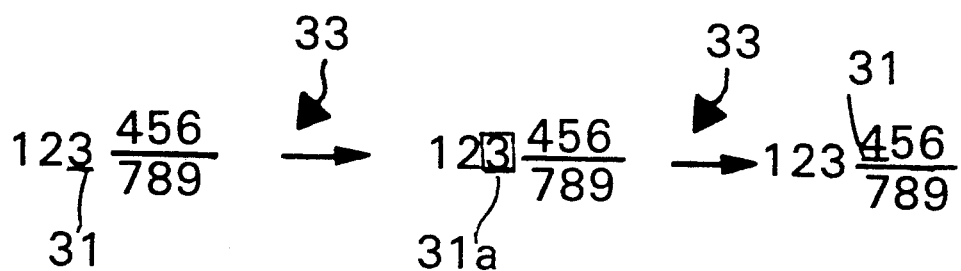
FIGS. 10A to 10C illustrate another example of the operation for, moving the cursor in the right direction according to the invention.
Figure 11:
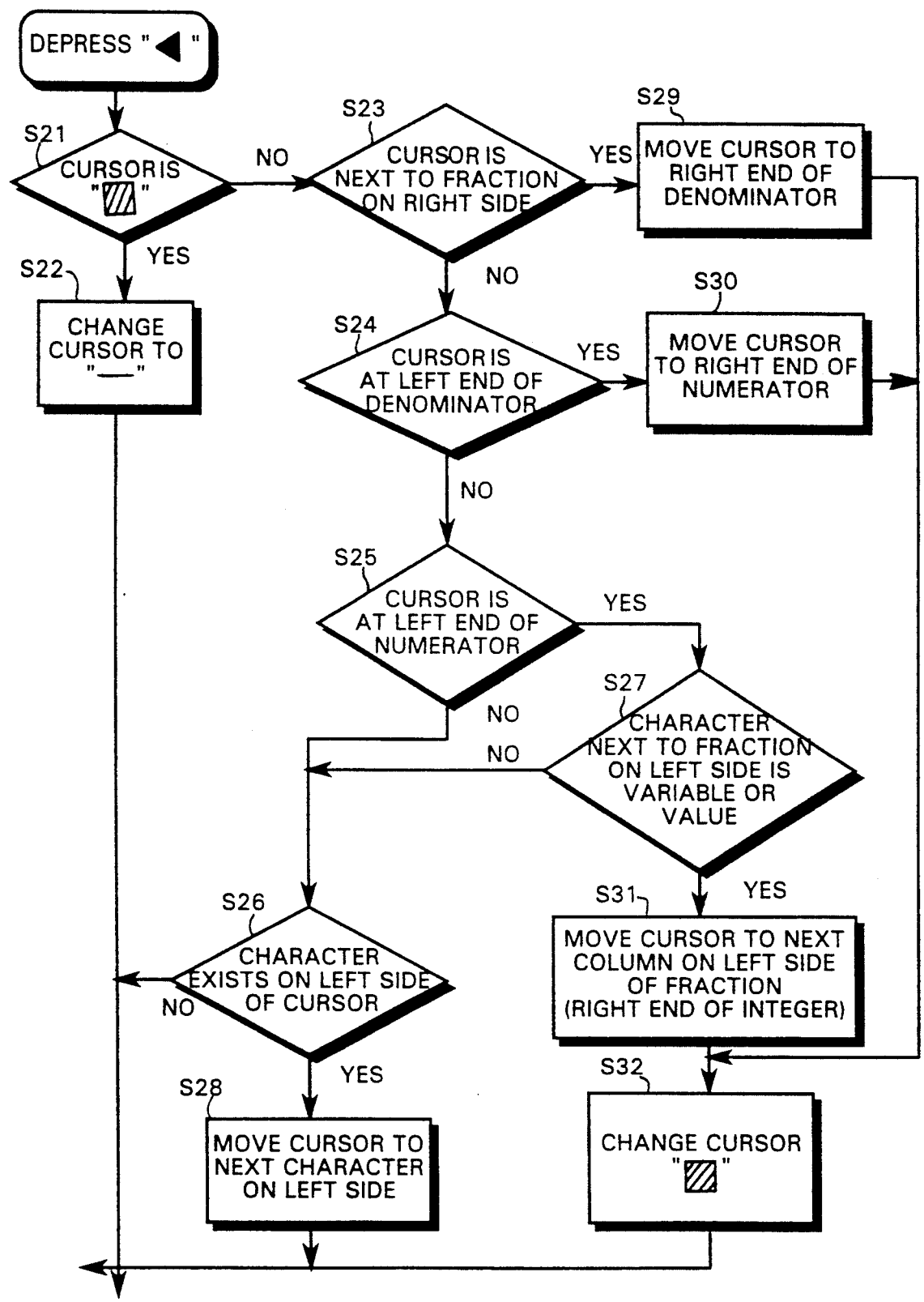
FIG. 11 is a flowchart illustrating an operation for moving the cursor in the left direction according to the invention.

In the example of FIGS. 10A-10C, the underline cursor 31 is positioned at the right end value "3" of the integer A, as shown in FIG. 10A. When, the right directional cursor key 33 of the keyboard 24 is depressed, the underline cursor 31 is changed to be the half-tone dot meshing cursor 31a, as shown in FIG. 10B. The above operation corresponds to a routine of steps S1→S6→S9 in the flowchart of FIG. 7. Also in this state, a value or a variable can be inserted or added.

When the right directional cursor key 33 is depressed again, the half-tone dot meshing cursor 31a is changed back to the underline cursor 31, and the underline cursor 31 is positioned at the left end value "4" of the numerator B. The above operation corresponds to a routine of steps S1→S6→S10→S13 in the flowchart of FIG. 7.

A routine of steps S1→S2→S3→S8→S12→S13 corresponds to situation where the half-tone dot meshing cursor 31a is positioned at the right end of the denominator C, and the right directional cursor key 33 is depressed. A routine of steps S1→S2→S3→S4→S5 corresponds to an operation in a case where the underline cursor 31 is positioned neither at the right end of the integer A, at the right end of the numerator B, nor at the right end of the denominator C, but the cursor 31 is positioned at a value or a variable of the mixed fraction. The cursor 31 is moved to the next column on the right side as specified by the right directional cursor key 33.

Next, an operation for moving the cursor 31 to the left (upper) direction in the mixed fraction which is input and displayed on the display device 25 is described with reference to FIGS. 11, 12A-12C and 13A-13C.

Figures 12A, 12B, 12C:
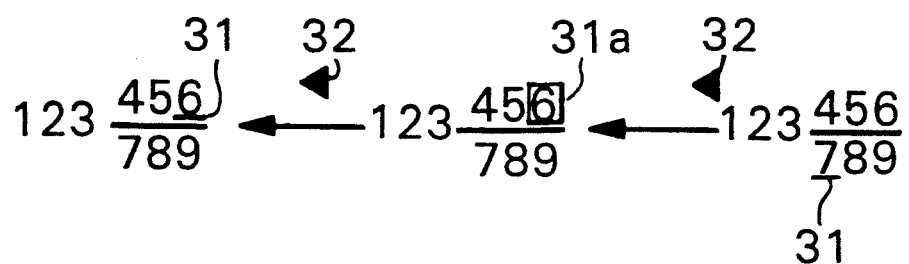
FIGS. 12A to 12C illustrate an example of the operation for moving the cursor in the left direction according to the invention.

In the example of FIGS. 12A-12C, the underline cursor 31 is positioned at the left end value "7" of the denominator C, as shown in FIG. 12A which is shown in the right portion of the drawing sheet for convenience. When the left directional cursor key 32 of the keyboard 24 is depressed, the cursor 31 is moved to the position of the right end value "6" of the numerator B, as shown in FIG. 12B which is shown in the middle of the drawing sheet. The cursor 31 is changed to the half-tone dot meshing cursor 31a. The above operation corresponds to a routine of steps S21→S23→S24→S30→S32 in the flowchart of FIG. 11.

When the left directional cursor key 32 is depressed again, the half-tone dot meshing cursor 31a is changed back to the underline cursor 31 without moving, as shown in FIG. 12C which is shown in the left portion of the drawing sheet. The above operation corresponds to a routine of steps S21→S22 in the flowchart of FIG. 11.

Figures 13, 13A, 13B:
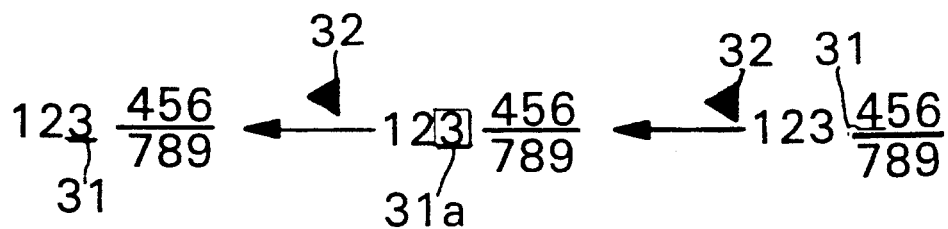

In an example of FIGS. 13A-13C, the underline cursor 31 is positioned at the left end value "4" of the numerator B, as shown in FIG. 13A. When the left directional cursor key 32 of the keyboard 24 is depressed, the cursor 31 is moved to the right end value "3" of the integer A, and the cursor 31 is changed to be the half-tone dot meshing cursor 31a, as shown in FIG. 13B. The above operation corresponds to a routine of steps S21→S23→S24→S25→S27→S31→S32 in the flowchart of FIG. 11.

When the left directional cursor key 32 is depressed again, the half-tone dot meshing cursor 31a is changed back to the underline cursor 31 without moving, as shown in FIG. 13C. The above operation corresponds to a routine of steps S21→S22 in the flowchart of FIG. 11.

A routine of steps S21→S23→S29→S32 corresponds to a situation where the underline cursor 31 is positioned next to the fraction on the right side, and the left directional cursor key 32 is depressed. In this operation, the cursor 31 is moved to the right end of the denominator C and changed to be the half-tone dot meshing cursor 31a. A routine of steps S21→S23→S24→S25→S26→S28 corresponds to an operation in a case where the underline cursor 31 is positioned neither at the left end of the integer A, at the left end of the numerator B, and at the left end of the denominator C, but is positioned at a value or a variable of the mixed fraction. The cursor 31 is moved to the next column on the left side as specified by the left directional cursor key 32.

When the half-tone dot meshing cursor 31a is displayed, a value or a variable can be inserted or added.

As described above, when moving a cursor in a displayed expression in the form of a mixed fraction, the border line between a numerator and a denominator is not elongated, and the cursor is not moved to the elongated portion of the borderline. Therefore, the movement of the cursor is useful for the operator to perform an input.

According to a computer of the invention operation. Moreover a value or a variable for an expression in the form of a mixed fraction can be input and displayed separately as an integer, a numerator, and a denominator of the mixed fraction with minimized movement of a cursor on a display screen, thereby facilitating the input operation.

According to a computer of the invention, after a value or a variable (a character) for an expression in the form of an improper or proper fraction is input and displayed as a numerator and a denominator of the fraction, a value or a variable (a character) can be input and displayed as an integer so as to make a mixed fraction, thereby increasing the flexibility in the input operation.

According to a computer of the invention, when a cursor is moved on a displayed expression in the form of a mixed fraction, unnecessary movement of the cursor such as that the borderline between a numerator and a denominator is elongated and the cursor is moved to the elongated portion can be eliminated, thereby facilitating the operation for moving the cursor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A computer comprising:
    input means for inputting data;
    signal generating means for generating a signal indicating that data input by the input means is a value for one of an integer, a numerator, and a denominator of a mixed fraction;
    a display for displaying data;
    storing means for storing the input data and a display position of the input data; and
    a data processor including:
    means for displaying an integer of a mixed fraction after first data input is displayed at a first display position, and when the generated signal is detected, for displaying a borderline between a numerator and a denominator of the mixed fraction, for generating a signal for moving a cursor to a second display position for displaying the numerator, and for storing the first data as data for the integer of the mixed fraction in the storing means;
    means for generating a signal for moving the cursor to a third display position for displaying the denominator after a second data input by the input means is displayed at the second display position, and for storing the second data as data for the numerator of the mixed fraction in the storing means; and
    means for displaying third data input by the input means at the third display position, for generating a signal for moving the cursor to an adjacent display position to the right side of the third display position, and for storing the third data as data for the denominator of the mixed fraction into the storing means.

2. A computer according to claim 1, further comprising converting means for converting data input by the input means into character data.

3. A computer comprising:
    input means for inputting data;
    first signal generating means for generating a signal indicating that data input by the input means is a value for one of a numerator and a denominator of a fraction;
    display means for displaying data;
    storing means for storing the input data and a display position of the data in the display means;
    second signal generating means for generating a signal for moving a cursor displayed on the display means in upper, lower, right or left directions; and
    a data processor including:
    means for displaying first data input by the input means at a first display position and for storing the first data in the storing means;
    means for displaying a borderline between a numerator and a denominator of the fraction at a display position to the right of the first display position when the signal generated by the first signal generating means is detected, for moving the first data to a second display position for displaying the numerator so as to display the first data at the second position, for generating a signal for moving the cursor to a third display position for displaying the denominator, and for storing the first data as numerator data in the storing means;

means for displaying second data input by the input means at the third display position, for generating a signal for moving the cursor to the display position to the right side of the displayed second data, and for storing the second data as denominator data in the storing means; and means for sequentially moving the cursor to the third display position, the second display position and then the first display position when a signal generated by the second signal generating means is detected for displaying third data input by the input means at a display position where the cursor is stopped to the left side of the first display position, and for storing the third data as data for an integer of a mixed fraction in the storing means.

4. A computer comprising:

input means for inputting data;

display means for displaying a cursor and data input by the input means as a value for one of an integer, a numerator, and a denominator of a mixed fraction;

signal generating means for generating a signal for moving the cursor displayed on the display means in upper, lower, right or left directions;

first means for changing the cursor from a first type to a second type when a signal is generated by the signal generating means in a state indicating that the cursor is positioned at a display position to the right side of a numerator;

second means for moving the cursor to a display position at the left side of a denominator and changing the type of the cursor to the first type when a signal is generated by the signal generating means indicating that the cursor is positioned at the right side of the numerator and the cursor is of the second type;

third means for changing the type of the cursor from the first type to the second type when a signal is generated by the signal generating means indicating that the cursor is positioned to the left and next to a borderline between the numerator and the denominator;

fourth means for moving the cursor to the left side of the numerator and changing the type of the cursor to the first type when a signal is generated by the signal generating means indicating that the cursor is positioned to the left and next to the borderline between the numerator and the denominator and the cursor is of the second type;

fifth means for moving the cursor to a a display position on the right side of the denominator when data is input by the input means indicating that the cursor is positioned at the right side of the denominator and the cursor is of the second type and for displaying the data at the cursor position; and sixth means for moving the cursor to a next display position on the right side when a signal generated by the signal generating means indicates that data exists at the position of the cursor.

5. A computer comprising:

input means for inputting data;

display means for displaying a cursor and data input by the input means as a value for one of an integer, a numerator, and a denominator of a mixed fraction;

signal generating means for generating a signal for moving the cursor displayed on the display means in upper, lower, right or left directions;

first means for changing the cursor from a first type to a second type when a signal is generated by the signal generating means in a state indicating that the cursor is of the first type and the cursor is positioned at the left side of a denominator;

second means for changing the type of the cursor to the first type when a signal is generated by the signal generating means indicating that the cursor is of the second type;

third means for moving the cursor, when a signal is generated by the signal generating means indicating the cursor is of the first type, the cursor is positioned at the left side of a numerator, and data exists at the left of a borderline between the numerator and the denominator, to the display position at the left of the borderline and changing the type of the cursor to the second type;

fourth means for moving the cursor to the right side of the denominator and changing the type of the cursor to the second type when a signal is generated by the signal generating means indicating the cursor is of the first type and the cursor is positioned at a display position on the right side of the denominator; and fifth means for moving the cursor, when a signal is generated by the signal generating means indicating that data exists to the left of the cursor, to the position of the data.

6. A method for operating a cursor of a computer, the computer comprising:

input means for inputting data, and a display, the method comprising the steps of:

changing the cursor from a first type to a second type when the cursor is positioned to the right of a numerator;

moving the cursor to the left of a denominator and changing the type of the cursor to the first one when the cursor is positioned to the right of the numerator and the cursor is of the second type;

changing the type of the cursor from the first to the second type when the cursor is positioned next and to the left of a borderline between the numerator and the denominator;

moving the cursor to the left of the numerator and changing the cursor to the first type when the cursor is positioned next to and to the left of the borderline between the numerator and the denominator and the cursor is of the second type;

moving the cursor to the right of the denominator when data is input by the input means and the cursor is positioned at the right end of the denominator and the cursor is of the second type, displaying the data at the cursor position; and moving the cursor to a next display position on the right side when data exists at the the cursor position.

7. A method for operating a cursor of a computer display comprising:

changing the cursor form a first type to a second type when the cursor is of the first type and the cursor is positioned at the left end of a denominator;

changing the cursor to the first type when the cursor is of the second type;

moving the cursor when the cursor is of the first type, the cursor is positioned at the left end of a numerator, and data exists at the left of a borderline between the numerator and the denominator, to the display position to the left of the borderline and changing the cursor to the second type;

moving the cursor to the right end of the denominator and changing the cursor to the second type when the cursor is of the first type and the cursor is positioned at a next display position to the right end data of the denominator; and moving the cursor when data exists at the left of the cursor to the position of the data.

* * * * *